United States Patent
Hattori et al.

(10) Patent No.: US 11,059,949 B2
(45) Date of Patent: Jul. 13, 2021

(54) PREPREG AND MOLDING PRODUCT THEREOF

(71) Applicants: NIPPON STEEL Chemical & Material Co., Ltd., Tokyo (JP); Mazda Motor Corporation, Aki-gun (JP); Nippon Graphite Fiber Corporation, Himeji (JP)

(72) Inventors: Koichi Hattori, Tokyo (JP); Yutaka Arai, Tokyo (JP); Masaki Shimada, Tokyo (JP); Tetsuya Sugiyama, Tokyo (JP); Katsuya Himuro, Aki-gun (JP); Masanori Honda, Aki-gun (JP); Kenji Nishida, Aki-gun (JP); Hironobu Takahama, Himeji (JP)

(73) Assignees: NIPPON STEEL CHEMICAL & MATERIAL CO., LTD., Tokyo (JP); Mazda Motor Corporation, Aki-Gun (JP); Nippon Graphite Fiber Corporation, Himeji (JP)

( * ) Notice: Subject to any disclaimer, the term of this patent is extended or adjusted under 35 U.S.C. 154(b) by 0 days.

(21) Appl. No.: 16/580,202

(22) Filed: Sep. 24, 2019

(65) Prior Publication Data

US 2020/0102436 A1  Apr. 2, 2020

(30) Foreign Application Priority Data

Sep. 28, 2018  (JP) .............................. JP2018-184256

(51) Int. Cl.
| | |
|---|---|
| C08J 5/24 | (2006.01) |
| C08G 59/26 | (2006.01) |
| C08G 59/40 | (2006.01) |
| C08K 3/04 | (2006.01) |
| C08J 5/04 | (2006.01) |
| C08K 7/06 | (2006.01) |
| C08K 7/14 | (2006.01) |

(52) U.S. Cl.
CPC .............. *C08J 5/24* (2013.01); *C08G 59/26* (2013.01); *C08G 59/4021* (2013.01); *C08J 2363/00* (2013.01); *C08J 2433/12* (2013.01); *C08K 3/04* (2013.01)

(58) Field of Classification Search
None
See application file for complete search history.

(56) References Cited

U.S. PATENT DOCUMENTS

| | | | |
|---|---|---|---|
| 2011/0184091 A1* | 7/2011 | Mizuki | ............. C08G 59/4238 523/428 |
| 2014/0037939 A1 | 2/2014 | Misumi et al. | |
| 2017/0369700 A1 | 12/2017 | Mitobe et al. | |

FOREIGN PATENT DOCUMENTS

| | | |
|---|---|---|
| JP | 2004-352024 A | 12/2004 |
| JP | 2010-100834 A | 5/2010 |
| JP | 2011-183471 A | 9/2011 |
| JP | 2017101227 A * | 6/2017 |
| WO | 2012/147401 A1 | 11/2012 |
| WO | 2016/104314 A1 | 6/2016 |
| WO | 2016/132655 A1 | 8/2016 |

* cited by examiner

*Primary Examiner* — Rachel Kahn
*Assistant Examiner* — Ha S Nguyen
(74) *Attorney, Agent, or Firm* — Locke Lord LLP; James E. Armstrong, IV; Nicholas J. DiCeglie, Jr.

(57) ABSTRACT

To provide prepreg having high thermostability and a molded body (fiber reinforced composite) obtained from the prepreg, the prepreg is formed by impregnating a reinforced fiber having an elastic modulus of 100 to 900 GPa with an epoxy resin composition including the following Components A to D so as to have a resin content within a range of 25 to 50 mass %: Component A: an epoxy resin having an oxazolidone ring structure in a molecule thereof; Component B: an epoxy resin that is liquid at 30° C.; Component C: a diblock copolymer having a B-M structure, wherein M is a block including at least 50 mass % of methyl methacrylate, B is a block immiscible with the epoxy resins and the block M, a glass transition temperature of the block B being 20° C. or lower; and Component D: dicyandiamide, or an amine curing agent that is a derivative of dicyandiamide.

6 Claims, No Drawings

PREPREG AND MOLDING PRODUCT THEREOF

BACKGROUND OF THE INVENTION

1. Field of the Invention

The present invention relates to prepreg that is a composite of a resin and a fiber such as a carbon fiber and a glass fiber, and is imparted with damping properties, vibration-attenuating properties and to a molded product of the prepreg.

2. Description of the Related Art

Conventionally, metals such as iron and aluminum are mainly used for components of automobiles in view of strength and thermostability. Fiber reinforced resins (FRPs), which are a composite of a fiber such as a glass fiber and a carbon fiber, and resin, to improve strength thereof, has strength as high as metals, and moreover makes it possible to achieve weight reduction. FRPs are therefore expected to be a material substituted for metal. In addition to strength, damping properties for more comfortable rides, etc., are often demanded of automobile parts. There have been however almost no idea to satisfy damping properties by metal or FRP automobile parts themselves.

Under such circumstances, Japanese Patent Application Publications No. 2011-183471 and Japanese Patent Application Publications No. 2004-352024 propose, though not a technique relating to automobile parts, such a technique that a damping layer such as a rubber layer and an elastomer layer is provided between FRP layers containing a fiber filler of a carbon fiber, a glass fiber, or the like, to improve damping properties. The desired strength however cannot be obtained even if this technique is used as it is for automobile parts such as a control arm. Because of this, this technique is required to be improved. Likewise, WO 2012/147401 and WO 2016/104314 propose that epoxy particles, or low modulus rubber particles are contained in an interlayer between FRP layers, to improve tan δ of the FRP. A satisfying value of tan δ in view of damping properties is however not obtained therefrom. WO 2016/132655 proposes a molded product that is a laminate of FRP layers and damping layers that are made of a synthetic resin and are between the FRP layers. A satisfying vibration-attenuating factor is however not obtained therefrom either, and there seems to be still a problem in thermostability that is considered to be necessary when the molding is used for automobiles.

Moreover, there have been almost no idea to satisfy damping properties by metal or FRP parts themselves.

SUMMARY OF THE INVENTION

With the foregoing in view, it is an object of the present invention to provide prepreg having high thermostability and high mechanical strength from which a molded product having excellent damping properties can be obtained, and the molding obtained from the prepreg as a fiber reinforced composite.

The inventors of the present invention have found, as a result of their intensive research for achieving the object, that using a specific resin composition makes it possible to solve the problems, and they finally completed the present invention.

That is, the present invention is prepreg that is formed by impregnating a reinforced fiber with an epoxy resin composition so as to have a resin content within a range of 25 to 50 mass %, an elastic modulus of the reinforced fiber being 100 GPa or higher and 900 GPa or lower, the epoxy resin composition having the following structure:

Component A: an epoxy resin having an oxazolidone ring structure in a molecule thereof;
Component B: an epoxy resin that is liquid at 30° C.;
Component C: a diblock copolymer having a B-M structure; and
Component D: an amine curing agent that is a dicyandiamide or a derivative thereof, wherein formulation of each component satisfies the following formulae:

$A/(A+B)=0.05$ to $0.25$;

$C/(A+B)=0.12$ to $0.19$; and $D/(A+B)=0.01$ to $0.10$, where A to D each represent contents (mass) of Components A to D.

In Component C, block M is a block including a homopolymer of methyl methacrylate, or a copolymer including at least 50 mass % of methyl methacrylate; block B is immiscible with the epoxy resins and the block M, a glass transition temperature Tg of the block B being 20° C. or lower, the blocks represented by B and M respectively being directly linked to, or being linked via a linker to each other.

Preferably, block M of Component C has a structural unit of the homopolymer of methyl methacrylate, and block B of Component C has a structural unit of a polymer selected from 1,4-polybutadiene, poly(butyl acrylate), and poly(2-ethylhexyl acrylate).

Further, a carbon fiber is suitably used for the reinforced fiber.

The present invention provides a molding product that is formed by molding and curing the prepreg.

In the molding product, an elastic modulus of a cured resin in the molding is preferably 1.0 to 2.5 GPa, and a ratio of the elastic modulus of the cured resin in the molding to that of the reinforced fiber is preferably 1:150 to 1:900.

The prepreg of the present invention has excellent processability and storage stability, and moreover, from which a molded product having excellent damping properties, vibration-attenuating properties can be obtained when the prepreg cures. That is, in the prepreg of the present invention, an acrylic block copolymer having good damping properties is contained in an epoxy resin composition in combination with a reinforced fiber of a specific elastic modulus, which can offer a molded product having high thermostability, a high loss factor, and excellent damping properties, vibration-attenuating properties. This molding is preferably usable for automobile parts.

DESCRIPTION OF THE PREFERRED EMBODIMENTS

An epoxy resin composition used in the present invention includes the following Components A to D:

Component A is an epoxy resin having an oxazolidone ring structure in a molecule thereof; Component B is an epoxy resin that is liquid at 30° C.; Component C is a block copolymer of B-M; and Component D is dicyandiamide, or an amine curing agent that is a derivative of dicyandiamide, which will be hereinafter also simply referred to as Component A, Component B, Component C, and Component D. The same expression, such as Component E, will be also used for other Components. The epoxy resin composition includes a resin composition used for producing the prepreg and an epoxy resin composition present in the prepreg. The latter epoxy resin composition present in the prepreg may partially cure. Partial curing of the epoxy resin composition present in the prepreg of the present invention preferably does not progress. The epoxy resin composition used for producing the prepreg will be also referred to as the epoxy resin composition of the present invention.

A cured material obtained by curing and molding the prepreg will be referred to as a molded product, and is also a reinforced fiber matrix or an FRP.

Hereinafter each component will be described.

Component A, which is an epoxy resin having an oxazolidone ring structure in a molecule thereof, leads to good workability of the prepreg containing the epoxy resin composition including Component A at ordinary temperatures, and improves thermostability of a cured material of the epoxy resin composition. Ordinary temperatures in this description mean temperatures ranging from 10° C. to 30° C.

Component A is preferably an epoxy resin having an oxazolidone ring structure in its molecule that is obtained by a reaction of an isocyanate compound and an epoxy resin.

An oxazolidone ring structure is formed by an addition reaction of an isocyanato group and an epoxy group. That is, Component A, which is an epoxy resin having an oxazolidone ring structure in a molecule thereof, can be obtained through a reaction of an isocyanate compound and an excessive epoxy resin.

Any isocyanate compound may be a raw material of the above described isocyanate compound, and a polyfunctional isocyanate compound having a plurality of isocyanato groups in a molecule thereof is preferable for incorporating an oxazolidone ring structure into the skeleton of an epoxy resin. Any diisocyanate having a rigid structure is preferable in order for the cured material of the epoxy resin composition including Component A to have high thermostability.

Examples of such an isocyanate compound include diisocyanates such as phenylene diisocyanate, toluylene diisocyanate, bis(isocyanatomethyl)benzene, diphenylmethane diisocyanate, bis(isocyanatomethyl)cyclohexane, and hexamethylene diisocyanate. Among them, phenylene diisocyanate, toluylene diisocyanate, bis(isocyanatomethyl)benzene, or diphenylmethane diisocyanate, which has a benzene ring in the skeleton thereof to have a rigid structure, is preferable. Among them, toluylene diisocyanate is especially preferable in view of economic availability.

Any epoxy resin may be a raw material of an epoxy resin for the reaction with an isocyanate compound. Any bifunctional epoxy resin having an epoxy group that terminates each end of a molecule thereof is preferable for efficiently incorporating an oxazolidone ring structure into the skeleton of the epoxy resin. Preferred examples of the epoxy resin include epoxy resins such as bisphenol A epoxy resins, bisphenol F epoxy resins, and biphenyl epoxy resins. Among them, a bisphenol A diglycidyl ether, a bisphenol F diglycidyl ether, or a biphenyl diglycidyl ether is preferable in order to obtain an epoxy resin having an oxazolidone ring structure and a viscosity that is not too high.

The epoxy resin having an oxazolidone ring structure preferably has a softening point of 60° C. to 100° C., and an epoxy equivalent weight (g/eq) of 300 to 400, in view of productivity, thermostability, compatibility, etc.

Especially, an adduct that is obtained by mixing and reacting one molecule of toluylene diisocyanate as the isocyanate compound with two molecules of a bisphenol A diglycidyl ether as the epoxy resin is especially preferable because of good operability of the prepreg at ordinary temperatures and good thermostability of the cured material of the epoxy resin composition.

Examples of commercially available epoxy resins having an oxazolidone ring structure include YD-952 (manufactured by NIPPON STEEL Chemical & Material Co., Ltd.), ACR1348 (manufactured by ADEKA Corporation), and DER852 (manufactured by Dow Corporate), any of which is preferably used in the present invention, and YD-952 is especially preferable.

Two or more of epoxy resins having an oxazolidone ring structure as described above may be used as Component A in combination.

The epoxy resin composition of the present invention includes an epoxy resin that is liquid at 30° C. (Component B). The viscosity of Component B is preferably low for adjustment of the viscosity of Component A. Component A may be liquid according to a molecular weight thereof, etc., but Component B is not the same as Component A.

The viscosity of Component B at 30° C. is preferably not higher than 1000 Pa·s. The viscosity of Component B at 30° C. can be known by: raising the temperature of Component B at 1 Hz in frequency at 2° C./min, and measuring the viscosity at 30° C. using, for example, a rheometer (rotational dynamic mechanical analyzer) such as DSR-200 (by Rheometrics, Inc.).

The molecular weight (Mw) of this liquid epoxy resin varies according to the structure thereof. For example, the molecular weight is preferably not less than 200 and less than 600, and is more preferably not more than 500, if the liquid epoxy resin is a bisphenol bifunctional epoxy resin.

Examples of the epoxy resin as Component B include, but are not limited to, bisphenol A epoxy resins, bisphenol F epoxy resins, biphenyl epoxy resins, dicyclopentadiene epoxy resins, phenol novolac epoxy resins, cresol novolac epoxy resins, tetraglycidyl diamine epoxy resins, and glycidyl phenyl ether epoxy resins; and further, for example, rubber-modified and urethane-modified resins thereof, and brominated epoxy resins thereof, and the like. Two or more of these epoxy resins may be used in combination. Two or more of these epoxy resins are used as long as Component B is liquid as a whole.

Component B is especially preferably a bisphenol bifunctional epoxy resin because of high thermostability of the cured material of the epoxy resin composition, no sudden viscosity rises even if the cured material is heated when molded and the temperature thereof reaches the curing temperature, and reduced voids in the molding to be obtained.

The epoxy resin composition of the present invention includes a diblock copolymer having a B-M structure (hereinafter will be also referred to as a diblock copolymer) as Component C. Component C improves toughness and damping properties of the epoxy resin composition while keeping excellent thermostability.

Here, the blocks each represented by B and M are directly linked to, or are linked via a linker to each other.

In the diblock copolymer, the block M is a block of a homopolymer of methyl methacrylate, or a copolymer including at least 50 mass % of methyl methacrylate. The block B is immiscible with the block M, and a glass transition temperature Tg thereof is 20° C. or lower.

Specific examples of Component C include diblock copolymers of poly(methyl methacrylate)/poly(butyl acrylate).

The block B of a soft polymer block immiscible with the epoxy resins, and the block M of a hard polymer block easy to be miscible with the epoxy resins well microdisperse in an epoxy resin matrix containing Components A and B. To microdisperse the diblock copolymer in the epoxy resins makes it possible to suppress deterioration of mechanical properties of the cured material of the epoxy resin composition and to improve the loss factor of the resin itself at the same time, to improve damping properties.

A diblock copolymer of poly(methyl methacrylate)/poly(butyl acrylate) having a hard block easily miscible with the epoxy resins is more preferable because dispersing in the epoxy resins well, and making it possible to suppress deterioration of mechanical properties of the cured material of the epoxy resin composition. Examples of commercially available diblock copolymers of poly(methyl methacrylate)/poly(butyl acrylate) include Nanostrength D51N by Arkema S. A.

The epoxy resin composition of the present invention includes an amine curing agent as Component D. Dicyandiamide or a derivative thereof is used as the amine curing agent for Component D.

Especially, dicyandiamide is preferably used because to use dicyandiamide leads to unchanging properties of the epoxy resin composition irrelevantly to moisture in the air, which makes it possible to keep the epoxy resin composition having a stable quality for a long term, and to complete curing at relatively low temperatures. Here, relatively low temperatures mean approximately 100° C. to 130° C.

Component D may contain another epoxy resin curing agent in addition to the amine curing agent. Examples of the other epoxy resin curing agent include imidazole compounds, acid anhydrides, and boron chloride amine complexes.

Examples of imidazole compounds include 2-phenyl-4,5-dihydroxymethylimidazole, and 2-phenyl-4-methyl-5-hydroxymethylimidazole.

Examples of acid anhydrides include hydrogenated methylnadic anhydride, and methylhexahydrophthalic anhydride.

The epoxy resin composition of the present invention may include an epoxy resin Z that is other than Components A and B as long as the effect of the present invention is not ruined.

The contents of Components A to D are such that Component A is 5 to 25 parts by mass, Component C is 12 to 19 parts by mass, and Component D is 1 to 10 parts by mass, on the basis of the total mass of Components A and B of 100 parts by mass. When the epoxy resin Z, which is other than Components A and B, is included, not the total mass of Components A and B, but that of all the epoxy resin components (Components A, B and Z) are preferably defined as 100 parts by mass.

The content of Component A is preferably 7 to 22 parts by mass, and more preferably 10 to 20 parts by mass. The content of Component A of not less than 5 parts by mass on the basis of the total mass of the epoxy resins of 100 parts by mass is preferable because of high thermostability and good mechanical properties of the cured material of the epoxy resin composition and in view of miscibility with Component C. Meanwhile, The content of Component A is preferably not more than 25 parts by mass in order to easily obtain a molded product having high fracture toughness and no void.

The content of Component B may be decided so that the content of Component A is within the above described range, and is preferably 78 to 93 parts by mass, and more preferably 80 to 90 parts by mass, on the basis of the total mass of the epoxy resins of 100 parts by mass.

The content of Component C is preferably 13 to 17 parts by mass. The content of Component C of not less than 12 parts by mass on the basis of the total mass of the epoxy resins of 100 parts by mass is preferable because of high tan δ of the cured material of the epoxy resin composition at 0° C. or higher. The content of Component C of not more than 19 parts by mass on the basis of the total mass of the epoxy resins of 100 parts by mass is preferable because of high flexural strength of the cured material of the epoxy resin composition.

The content of Component D is changed depends on Component D. For example, if Component D is dicyandiamide, the content thereof is normally 1 to 10 parts by mass on the basis of the total mass of the epoxy resins of 100 parts by mass.

More preferably, the content of Component D is such that the number of moles of activated hydrogen in dicyandiamide is 0.6 to 1.0 times as large as that of all the epoxy groups the epoxy resins contained in the epoxy resin composition have. The number of moles of activated hydrogen in dicyandiamide of 0.6 times or larger makes it possible to obtain a cured material having high thermostability and good mechanical properties (that is, high strength). The number of moles thereof of 1.0 times or smaller makes it possible to obtain a cured material having good mechanical properties. The number of moles of activated hydrogen in dicyandiamide is preferably 0.6 to 0.8 times as large as that of all the epoxy groups the epoxy resins contained in the epoxy resin composition have.

The number of moles of all the epoxy groups the epoxy resins contained in the epoxy resin composition have may be calculated based on the raw materials of the epoxy resins.

The epoxy resin composition of the present invention may contain Component E as a curing accelerator. Examples of the curing accelerator include urea compounds, tertiary amines and salts thereof, imidazole and salts thereof, and Lewis acids, Bronsted acids, and salts thereof. Among them, an urea compound is preferably used in view of balanced storage stability and accelerating performance.

Examples of the urea compound include N,N-dimethyl-N'-(3,4-dichrolophenyl)urea, toluene bis(dimethylurea), 4,4'-methylene bis(phenyl dimethylurea), and 3-phenyl-1,1-dimethylurea. Examples of commercially available urea compounds include DCMU99 (manufactured by Hodogaya Chemical Co., Ltd.), and Omicure 24, Omicure 52, and Omicure 94 (these three are manufactured by Emerald Performance Materials, LLC).

The formulation of Component E is preferably 1 to 7 parts by mass, and more preferably 3 to 5 parts by mass, on the basis of the total mass of the epoxy resins of 100 parts by mass. The formulation of less than 1 part by mass may lead to an insufficiently progressing reaction to deteriorate the elastic modulus and thermostability of the cured material. The formulation of more than 7 parts by mass may lead to self-polymerization of the epoxy resins which blocks the reaction of the epoxy resins and the curing agent, which may lead to deterioration of toughness and a reduced elastic modulus of the cured material.

The epoxy resin composition may contain any additive (Component F) such as a thermoplastic resin, a thermoplastic elastomer, an elastomer (except a thermoplastic elastomer), an antifoaming agent, and a leveling agent as an optional Component.

When, for example, a thermoplastic resin, a thermoplastic elastomer, or an elastomer is contained as Component F, Component F not only plays a role of changing the viscoelasticity of the epoxy resin composition to make viscosity, storage modulus, and thixotropy proper, but also improves fracture toughness of the cured material of the epoxy resin composition. A thermoplastic resin, a thermoplastic elastomer, and an elastomer may be used individually, or two or more of them may be used in combination. The formulation of this additive may be 1 to 15 parts by mass, and preferably 1 to 10 parts by mass, on the basis of the total mass of the whole of the resin composition of 100 parts by mass.

A thermoplastic resin or the like may dissolve in any Component in the epoxy resin composition, or may be contained in the epoxy resin composition in the form of a fine particle, long fiber, staple fiber, a woven fabric, a non-woven fabric, mesh, pulp, or the like.

A preferably used thermoplastic resin is a thermoplastic resin having at least one bond selected from the group of a carbon-carbon bond, an amide bond, an imide bond, an ester bond, an ether bond, a carbonate bond, an urethane bond, an urea bond, a thioether bond, a sulfone bond, an imidazole bond and a carbonyl bond in a main chain thereof. More specific examples thereof include thermoplastic resins falling under engineering plastics such as polyacrylates, polyamides, polyaramids, polyesters, polycarbonates, polyphenylene sulfides, polybenzimidazoles, polyimides, polyetherimides, polysulfones, and polyethersulfones.

Among them, a polyimide, a polyetherimide, a polysulfone, or a polyethersulfone is especially preferably used because having excellent thermostability. These thermoplastic resins preferably have a functional group reactive to the epoxy resins in view of improvement of fracture toughness and maintained resistance in the environment of the cured material of the epoxy resin composition of the present invention. Examples of functional groups preferably reactive to the epoxy resins include a carboxyl group, an amino group, and a hydroxyl group.

An antifoaming agent and/or a leveling agent may be added as Component F for the purpose of improving surface smoothness. The formulation of this additive may be 0.01 to 3 parts by mass, and preferably 0.01 to 1 part by mass, on the basis of the total mass of the whole of the epoxy resin composition of 100 parts by mass. The formulation of less than 0.01 part by mass does not lead to the effect of smoothing the surface, and the formulation of more than 3 parts by mass causes the additive to bleed out on the surface, to contrarily ruin the smoothness, which are not preferable. A pigment or any other additive may be blended as necessary.

It is better that the formulation of Components A to D in the epoxy resin composition of the present invention is not less than 50 mass %, and preferably not less than 80 mass %, on the basis of the total mass of the composition of 100 parts by mass, so as to keep a liquid form thereof as a whole. It is noted that a solvent is not treated as the additive.

When the total mass of Components A to F is defined as 100 parts by mass, preferred formulation of Components A to F (parts by mass) is as follows:

Component A: 5 to 25, preferably 10 to 20;
Component B: 50 to 80, preferably 60 to 75;
Component C: 10 to 25, preferably 10 to 20; and
Component D, or the total mass of Components D and F: 3 to 20, preferably 5 to 17.

A method for producing the epoxy resin composition of the present invention is not specifically limited. The epoxy resin composition of the present invention may be produced by a known method.

When the epoxy resin composition of the present invention is as a molded product (may be also referred to as a reinforced fiber matrix, a molded body, or a cured material), the elastic modulus of a simple of the resin composition if the simple is cured is preferably 1.0 to 2.5 GPa. The elastic modulus of this cured material may be regarded as the elastic modulus of the resin in the molding (cured resin).

The prepreg of the present invention may be obtained by impregnating a reinforced fiber with the epoxy resin composition.

Examples of a mode of a reinforced fiber matrix used for the prepreg of the present invention include a mode of unidirectional tow, cross, chopped fiber, or continuous fiber, a mode of a two-dimensional textile of continuous fiber, a mode of unidirectional tow kept by weft ancillary yarn, a mode of laminating a plurality of sheets of unidirectional reinforced fiber in different directions, and stitching the laminated sheets with ancillary yarn to have multi-axial warp knitting, and a mode of a nonwoven fabric of a reinforced fiber.

Among them, the mode of unidirectional continuous fiber, the mode of a two-dimensional textile of continuous fiber, the mode of unidirectional tow kept by weft ancillary yarn, and the mode of laminating a plurality of sheets of unidirectional reinforced fiber in different directions, and stitching the laminated sheets with ancillary yarn to have multi-axial warp knitting are preferable. The mode of unidirectional continuous fiber is further preferable in view of strength development of the molding.

Any reinforced fiber may be used for composing the reinforced fiber matrix without limitation. Examples thereof include a carbon fiber, a graphite fiber, a glass fiber, an organic fiber, a boron fiber, and a steel fiber. Among them, a carbon fiber or a graphite fiber may be preferably used for the prepreg of the present invention because having a good specific modulus, and a large effect on weight reduction of the molding containing this fiber. Any of carbon fibers and graphite fibers may be used according to the purpose.

The prepreg of the present invention may be obtained by impregnating the reinforced fiber matrix with the epoxy resin composition by a known method. For example, the prepreg may be produced by: coating the surface of release paper or the like with the epoxy resin composition of a predetermine amount, supplying the reinforced fiber to this surface, and thereafter passing a press roll along the release paper to impregnate the reinforced fiber with the epoxy resin composition; or directly coating the reinforced fiber with the epoxy resin composition of a predetermine amount, followed by sandwiching the coated reinforced fiber between release paper or the like as necessary, and thereafter passing a press roll along the sandwiched reinforced fiber to impregnate the reinforced fiber with the epoxy resin composition.

The elastic modulus of the reinforced fiber used in the present invention is 100 GPa or higher and 900 GPa or lower. The content of the resin in the prepreg is 25 to 50 mass %.

When vibration inputs into the molding containing the reinforced fiber, the vibration propagates through routes among the fiber and the resin. Generally, there is a close correlation between the propagation velocity and the density of a substance. Vibration propagates faster in a fiber of a higher elastic modulus. The vibration inputting into the molding resonates due to the difference of the propagation velocity between the fiber and the resin, and causes vibration-attenuating effect on the interface, to cause a loss factor as the molding. It is believed that to use a resin having high tan δ and a high vibration-attenuating effect, and a fiber having an elastic modulus of 100 to 900 GPa together makes it possible to have vibration-attenuating effect on the interface therebetween as well, and to cause a preferred loss factor as the whole of the molding.

For the foregoing reason, the ratio of elastic modulus of the cured resin in the molding containing the reinforced fiber to that of the reinforced fiber is preferably 1:150 to 1:900. The elastic modulus of this resin for high tan δ is preferably 1.0 to 2.5 GPa, and more preferably 1.0 to 2.0 GPa. A pitch-based carbon fiber having a high elastic modulus is preferable to a glass fiber and a PAN-based carbon fiber having a low elastic modulus because a higher ratio of the elastic modulus of the resin to that of the fiber leads to better damping properties. The ratio of the elastic modulus is further preferably within a range of 1:300 to 1:900 because pitch-based carbon fibers of a high elastic modulus is generally 600 to 900 GPa in elastic modulus. Here, the elastic modulus means the flexural modulus.

The molding of the present invention is formed of the cured material of the epoxy resin composition, and the reinforced fiber. This molding may be unlimitedly used for structural materials for aircrafts, automobiles, ships, sports, other general industry including wind power generation, and rolls for general industry. This molding is suitably used for transport equipment of which damping properties are demanded, such as automobiles.

The molding of the present invention may be obtained by molding the prepreg of the present invention. Specific examples of a method for producing the molding include, but are not limited to, molding such as autoclave molding, sheet wrap molding, internal-pressurizing molding, and compression molding; and molding of impregnating a filament or a preform of the reinforced fiber with the epoxy resin composition, to be cured and obtain the molding, such as Resin Transfer Molding (RTM), Vacuum assisted Resin Transfer Molding (VaRTM), filament winding, and Resin Film Infusion (RFI).

A method for producing the molding by compression molding on the prepreg of the present invention preferably includes a step of holding to heat and pressurize the prepreg of the present invention, or a preform of laminated prepregs between metallic molds whose temperature is adjusted to the curing temperature in advance. The temperature of the metallic molds is preferably 120° C. to 150° C., and the curing time is preferably 5 to 60 minutes.

EXAMPLES

Hereinafter the present invention will be specifically described by Examples. The present invention is not limited to Examples at all. The units of the contents of Components A to F in Tables 1 and 2 are all represented by part(s) by mass.

Raw Material
Bifunctional epoxy resin having an oxazolidone ring (YD-952 manufactured by NIPPON STEEL Chemical & Material Co., Ltd.)
Bisphenol A bifunctional epoxy resin (YD-128 manufactured by NIPPON STEEL Chemical & Material Co., Ltd.; viscosity (25° C.): 13000 mPa·s)
bisphenol A bifunctional solid epoxy resin (YD-011 manufactured by NIPPON STEEL Chemical & Material Co., Ltd.; solid at ordinary temperatures)
phenol novolac bifunctional epoxy resin (KDPN-1020 manufactured by NIPPON STEEL Chemical & Material Co., Ltd.; liquid at ordinary temperatures)
bisphenol A/bisphenol F-copolymerized phenoxy resin (YP-70 manufactured by NIPPON STEEL Chemical & Material Co., Ltd.; solid at ordinary temperatures)
acrylic block copolymer (Nanostrength D51N)
dicyandiamide (DICY15 manufactured by Mitsubishi Chemical Corporation)
3-(3,4-dichrolophenyl)-1,1-dimethylurea (DCMU99 manufactured by Hodogaya Chemical Co., Ltd.)
Carbon Fiber
high modulus pitch-based carbon fiber (XN-90; tensile modulus: 860 GPa)
high modulus pitch-based carbon fiber (XN-80; tensile modulus: 780 GPa)
middle modulus pitch-based carbon fiber (YSH-50A; tensile modulus: 520 GPa)
middle modulus PAN-based carbon fiber (T-700SC manufactured by Toray Industries, Inc.; tensile modulus: 230 GPa)
low modulus pitch-based carbon fiber (XN-05; tensile modulus: 50 GPa)
(the foregoing pitch-based carbon fibers were all manufactured by Nippon Graphite Fiber Co., Ltd.)
GF (E-glass fiber manufactured by Nitto Boseki Co., Ltd.; tensile modulus: 75 GPa)

Production Examples of Epoxy Resin Composition

The formulation of the epoxy resin composition used in the present invention is shown in Table 1.

Part of YD-128 (18 parts), and the total mass of DICY15 and DCMU99 were uniformly dispersed with a three roll mill, to prepare a resin composition 1.

The components used for the preparation of the resin composition 1 was excluded from all the components shown in Table 1, and the rest thereof was weighed in a glass flask and hot-mixed at 150° C., to obtain a uniform masterbatch. Next, the obtained masterbatch was cooled to 60° C. or lower. Thereafter the resin composition 1 was weighed and added to the cooled masterbatch, and hot-mixed at 60° C. to 70° C. to be uniformly dispersed, to obtain an epoxy resin compositions E1 (Formulation Example 1) and E2 (Formulation Example 2). The formation of each of the obtained epoxy resin compositions is as shown in Table 1.

Each of the obtained epoxy resin compositions was sandwiched between metal plates, together with a spacer made from polytetrafluoroethylene and having a thickness of 1 mm, kept compressed at 150° C. at 1 MPa for 60 minutes to be cured, to obtain a cured resin plate for dynamic mechanical analysis (DMA).

The epoxy resin composition E1 or E2 was poured into a metallic mold of 4 mm in thickness, 10 mm in width and 150 mm in length as heated at 60° C. to 80° C., subjected to vacuum defoaming, and thereafter cured at 150° C. for 60 minutes, to obtain a cured resin plate for a flexural test. The results thereof are shown in Table 1.

Method for Measuring Tan δ

The cured resin test plate for DMA was processed to be a test piece (60 mm in length and 5 mm in width), and dynamic viscoelasticity thereof was measured at 0.1% in tensile displacement at 1 Hz in frequency at temperatures within a range of 0° C. to 250° C., using a dynamic mechanical analyzer (RSA3 manufactured by TA Instruments). The mean value of the obtained tan δ at 0° C. to 10° C. was used, and represented by tan $δ_{(0-10° C.)}$. The obtained tan δ was also used to represent a loss factor at each temperature. The temperature at which tan δ was the maximum was Tg (glass transition temperature).

Method for Measuring Flexural Properties of Cured Resin Plate

Flexural properties of the cured resin plate for a flexural test were measured using a universal testing machine with a load cell of 1000 N (product name: AGS-X manufactured by Shimadzu Corporation). Flexural strength, flexural modulus, and flexural strain of the test piece were measured in the environment at 23° C. in temperature at 50% RH in humidity, using a three-point flexural jig, conforming to JIS K 7074.

The formations, and the results of the tests are shown in Table 1.

TABLE 1

|  | Formulation Example 1 | Formulation Example 2 |
|---|---|---|
| epoxy resin composition | E1 | E2 |
| YD-952 | 15 |  |
| YD-128 | 45 | 45 |
| KDPN-1020 | 40 | 30 |
| D-51N | 17 |  |
| YD-011 |  | 15 |
| YP-70 |  | 10 |
| DICY-15 | 5.5 | 4.5 |
| DCMU99 | 4.7 | 3.8 |
| $\tan\delta_{(0\ °C.\ to\ 10\ °C.)}$ | 0.043 | 0.014 |
| flexural strength (MPa) | 55 | 120 |
| flexural strain (%) | 5 | 8 |
| flexural modulus (GPa) | 1.5 | 3.0 |

Examples 1 to 3 and Comparative Examples 1 to 5

Prepreg and moldings were made by the following method, using the carbon fibers shown in Table 2, and the epoxy resin composition (E1 or E2).

The epoxy resin composition was melted at 70° C., applied to release paper at 55 g/m² in areal weight, and closely adhered to a polyethylene covering material, to make a resin sheet. Next, the reinforced fiber was unidirectionally laminated onto the resin sheet from which the covering material was released, at 200 g/m² in areal weight, and another resin sheet was laminated onto the top of the laminated fiber layer as well, to make a laminate made of resin layer-reinforced fiber layer-resin layer. A hot press roll at 80° C. was passed along the laminate to impregnate the fiber layer with the resin, to make prepreg. The layers of a predetermined number were laminated so that this prepreg had a predetermined thickness (for example, 1 to 4 mm). The prepreg was cured at 150° C. for 1 hour, to obtain a molded product containing a reinforced fiber of 60% in Vf (fiber volume content).

Method for Measuring Loss Factor

A plate test piece of 250 mm in length, 25 mm in width and 1.5 mm in thickness was made out of the molding of the reinforced fiber. A vibrating head of a vibration generator was adhered to an end of the test piece with a commercially available adhesive. Impedance was measured with a laser vibrometer at 7 points of the test piece in longitudinal direction and 3 points thereof in width direction, that is, 21 points in total, when the end of the test piece was vibrated, to identify a loss factor (torsion). The formation having a loss factor of 0.015 or higher was determined that the formulation has a good loss factor ("good" in Table 2), and the formulation having a loss factor lower than 0.015 was determined that the formulation has a bad loss factor ("bad" in Table 2). The vibration frequency was random (white noise).

As shown in Tables 1 and 2, it is found that prepreg is designed using the epoxy resin composition having excellent tan δ as Formulation Example 1, and a reinforced fiber of 100 to 900 GPa, so that the resin content thereof is 25 to 50 mass %, and so that the ratio of the elastic modulus of the resin of the molding to that of the reinforced fiber is 1:150 to 1:900, which leads to a high loss factor.

TABLE 2

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| reinforced fiber | XN-90 | XN-80 | T-700SC | XN-05 | GF | XN-80 | YSH-50A | T-700SC |
| resin composition | E1 | E1 | E1 | E1 | E1 | E2 | E2 | E2 |
| ratio of elastic modulus | 573.3 | 520.0 | 153.3 | 33.3 | 50.0 | 260.0 | 173.3 | 76.7 |
| loss factor | 0.0214 | 0.0208 | 0.0194 | 0.0113 | 0.0125 | 0.0136 | 0.0113 | 0.0081 |
| determination | good | good | good | bad | bad | bad | bad | bad |

The molding obtained by heating and curing the prepreg of the present invention can achieve a high loss factor, and not only has good thermostability and mechanical properties, but also can achieve excellent damping properties, vibration-attenuating properties.

Therefore, the present invention can offer a wide variety of fiber reinforced plastic moldings having high thermostability, and excellent damping properties vibration-attenuating properties, such as moldings for damping materials for automobiles and industry, for aircrafts, and for sports and leisure.

What is claimed is:

1. A prepreg that is formed by impregnating a reinforced fiber with an epoxy resin composition so as to have a resin content within a range of 25 to 50 mass %, an elastic modulus of the reinforced fiber being 100 GPa or higher and 900 GPa or lower;

the epoxy resin composition comprising the following Components A to D:

Component A: an epoxy resin having an oxazolidone ring structure in a molecule thereof;

Component B: an epoxy resin that is liquid at 30° C.;

Component C: a diblock copolymer having a B-M structure, wherein block M is a block consisting of a homopolymer of methyl methacrylate, or a copolymer including at least 50 mass % of methyl methacrylate; block B is immiscible with the epoxy resins and the block M, a glass transition temperature Tg of the block B being 20° C. or lower; the blocks B and M being directly linked to, or being linked via a linker to each other; and Component D: an amine curing agent that is a dicyandiamide or a derivative thereof, wherein formulation in terms of mass ratio of Components A to D satisfies the following formulae:

$A/(A+B)=0.05$ to $0.25$ $C/(A+B)=0.12$ to $0.19$ $D/(A+B)=0.01$ to $0.10$ where A to D each represent contents of Components A to D, and wherein an elastic modulus of the cured epoxy resin composition is 1.0 to 2.5 GPa.

2. The prepreg according to claim 1, wherein the block M of the Component C is a block having a structural unit of the homopolymer of methyl methacrylate, and the block B of the Component C is a block having a structural unit of a polymer selected from 1,4-polybutadiene, poly(butyl acrylate), and poly(2-ethylhexyl acrylate).

3. The prepreg according to claim 1, wherein the reinforced fiber is a carbon fiber.

4. A molding product that is a cured product of a prepeg that is formed by impregnating a reinforced fiber with an epoxy resin composition so as to have a resin content within a range of 25 to 50 mass %, an elastic modulus of the reinforced fiber being 100 GPa or higher and 900 GPa or lower;

the epoxy resin composition comprising the following Components A to D:

Component A: an epoxy resin having an oxazolidone ring structure in a molecule thereof;

Component B: an epoxy resin that is liquid at 30° C.;

Component C: a diblock copolymer having a B-M structure, wherein block M is a block consisting of a homopolymer of methyl methacrylate, or a copolymer including at least 50 mass % of methyl methacrylate; block B is immiscible with the epoxy resins and the block M, a glass transition temperature Tg of the block B being 20° C. or lower; the blocks B and M being directly linked to, or being linked via a linker to each other; and Component D: an amine curing agent that is a dicyandiamide or a derivative thereof, wherein formulation in terms of mass ratio of Components A to D satisfies the following formulae:

$A/(A+B)=0.05$ to $0.25$ $C/(A+B)=0.12$ to $0.19$ $D/(A+B)=0.01$ to $0.10$ where A to D each represent contents of Components A to D; and wherein an elastic modulus of the cured epoxy resin composition in the molded product is 1.0 to 2.5 GPa.

5. The molding product according to claim 4, wherein a ratio of the elastic modulus of the cured epoxy resin composition to that of the reinforced fiber in the molded product is 1:150 to 1:900.

6. The prepreg according to claim 1, wherein $C/(A+B)=0.13$ to $0.17$.

* * * * *